Patented July 29, 1947

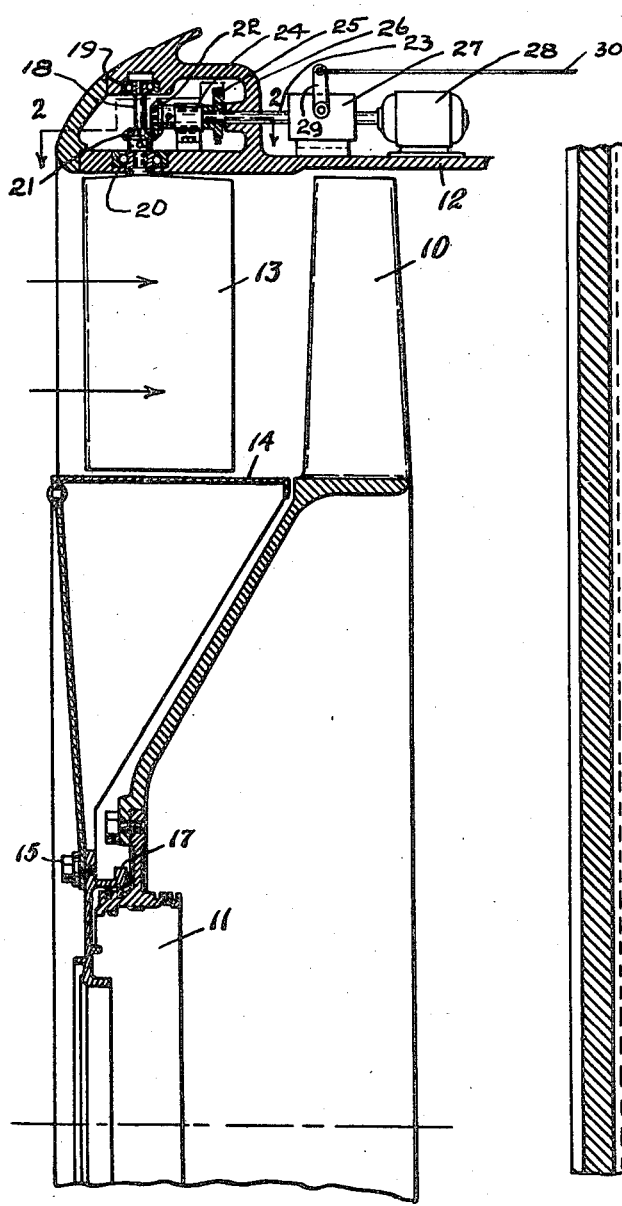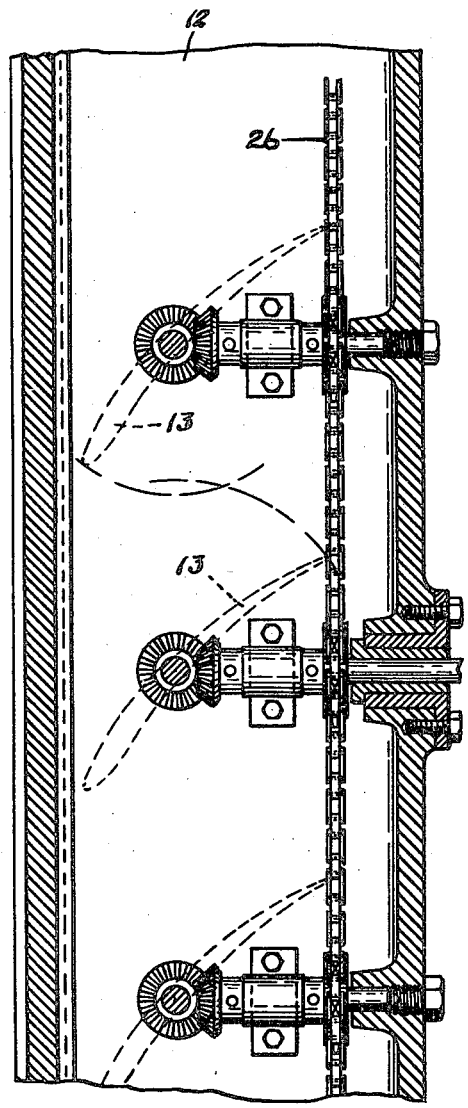

2,424,839

UNITED STATES PATENT OFFICE 2,424,839

SPIN VANES CONTROL DEVICE FOR COOLING FANS IN AIRCRAFT ENGINES

Harry E. Morton, Boston, Mass., assignor to B. F. Sturtevant Company, Boston, Mass.

Application September 21, 1943, Serial No. 503,227

2 Claims. (Cl. 123—171)

1

This invention relates to control vanes for fans, of the type which may be adjusted to add spin to the air handled by a fan for reducing its pressure, or which may be adjusted to provide counter spin to the air handled by a fan for increasing its pressure.

Control vanes of this type are shown generally by the H. F. Hagen U. S. Patents Nos. 1,846,863 and 1,892,303, and the theory of their operation is explained fully therein.

It is usual to support control vanes of this type, which will in the following be referred to as "spin vanes," by pivoting them at their bases and tips, the pivots of their bases being journaled in inner housings around the shafts of fans and the pivots of their tips being journaled in the outer casings guiding the air into the fans. Such constructions are shown by the H. F. Hagen U. S. Patent No. 1,989,413 and the Bartlett and Leonard U. S. Patent No. 2,113,391.

Such constructions are not desired for some types of service, particularly in the case where the spin vanes are to be used with a fan in the cowl of an airplane engine, for the reasons that the inner supporting housings would obstruct the air stream and cause turbulence therein and the cowls would be attached through the vanes to the inner housings with the result that the relative movement between the cowl and the engine would set up vibrations in the vanes and would tend to bind them against adjustment. Another difficulty is that of providing access in the case of an airplane to the inner supports for the servicing thereof.

This invention provides vane adjusting mechanism located entirely at the periphery of the spin vanes and adjustable by a chain drive common to all and readily accessible for installation and servicing.

In modern, high powered airplanes, the air pressures provided by the impact of the cylinders of air cooled engines against the air, and the radiators of liquid cooled engines against the air, even when aided by the induction action of flaps, are insufficient for providing adequate air volumes at all times for cooling the engines. This is especially so in the case of airplanes which are designed for high altitude flying where the density of the air is low. Accordingly it has become necessary to provide fans driven by the engines for providing adequate cooling. However, since the fan must be designed to provide the air pressures required at high altitudes, at low levels it provides much higher pressures than

2 are needed and consumes too much power from the engine.

Adjustable spin vanes provide a satisfactory method of adjusting the pressure provided by such a fan and for varying the power required by the fan from the engine.

At low altitudes and for take-offs where less cooling is required, the spin vanes may be adjusted towards maximum spin in the direction of rotation of the fan blades whereby the fan will provide low air pressures and consume reduced power from the engine.

For high altitude flying the spin vanes may be adjusted to positions providing no spin or to positions providing contra spin for providing high air pressures.

In the case of an airplane it is desirable to have the vanes adjusted under thermostatic control thus relieving the pilot of the burden of watching temperatures. A thermostat can be used to close the vanes when decreased air volumes will cool the engine. An injury such as one resulting from combat may injure the mechanism of such an automatic control when the vanes are closed with the result that when increased cooling is required, the vanes remain closed and the air volume cannot be increased.

This invention provides spin vanes which have more surface on the downstream sides of their pivot points than on their upstream sides whereby the air pressure tends to force them towards open position, and provides a control operable from the pilot's cockpit for declutching the motor which rotates the vanes so that the vanes will be forced to full open position by the air pressure.

The invention will now be described with reference to the drawing, of which:

Fig. 1 is a partial side elevation partially in section of vane control mechanisms embodying this invention;

Fig. 2 is a partial developed section along the lines 2—2 of Fig. 1;

Figure 3:
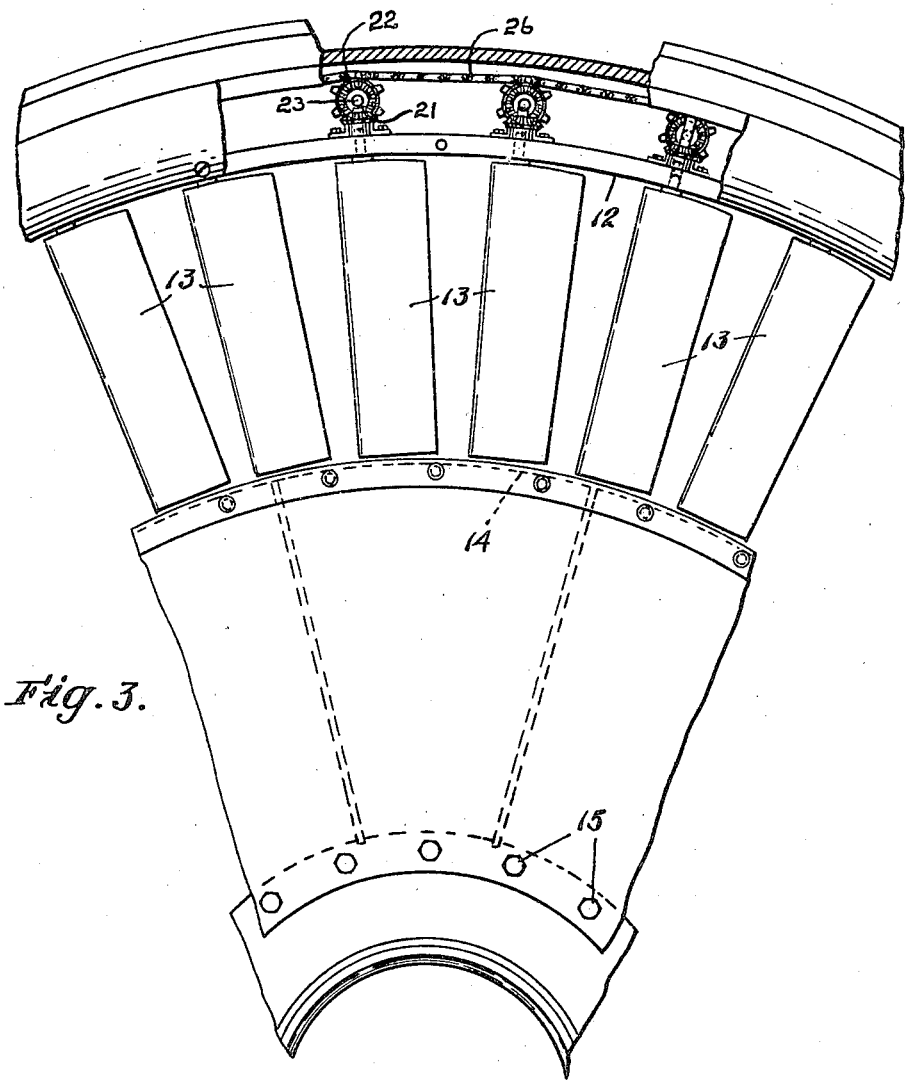
Fig. 3 is a partial front view with a portion broken away of the mechanism of Figs. 1 and 2.

With reference to the drawing, a propeller fan comprising a plurality of blades 10 mounted on a hub 11, is provided for cooling an airplane and is adapted to be driven from the engine by mechanism not shown.

The cowl 12 extends around the fan and the spin vanes 13 are supported in the front end of the cowl, the assembly illustrated being for a tractor type engine.

The vanes have substantially the same inner and outer diameters as the blades 10. The cylindrical baffle 14 extends under the vanes 13 and serves to guide all the air entering the cowl, through the vanes.

The baffle 14 is bolted at 15 to the member 16 which in turn is adapted to be bolted to the engine to which the assembly is applied. The member 16 has the inner extension 17 forming an oil seal around the hub 11.

The vanes 13 are attached to the pivot rods 18 which are journaled for rotation in the cowl, in the upper ball bearings 19 and the lower ball bearings 20. The bevel gears 21 which are keyed to the rods 18 just above the bearings 20, are in mesh with the bevel gears 22 which are keyed to the shafts 23 which are journaled in the bearings 24.

The shafts 23 have the sprocket wheels 25 keyed thereto and the chain 26 is in mesh with the sprocket teeth thereof. One of the shafts 23 as illustrated by Fig. 1, is longer than the others and extends through the wall 26 of the cowl and is connected through the conventional clutch 27 with the electric motor 28.

The lever 29 of the clutch 27 is connected by the rod 30 with a control on the pilot's or another crew member's control panel.

The motor 28 by rotating one of the shafts 23, rotates the other shafts 23 through the chain 26 and sprocket wheels 25, and through the gears 21 and 22 and the pivot rods 18, the vanes 13. The vanes may thus be rotated simultaneously towards open or closed positions depending upon the direction of rotation of the motor 28.

Figure 4:
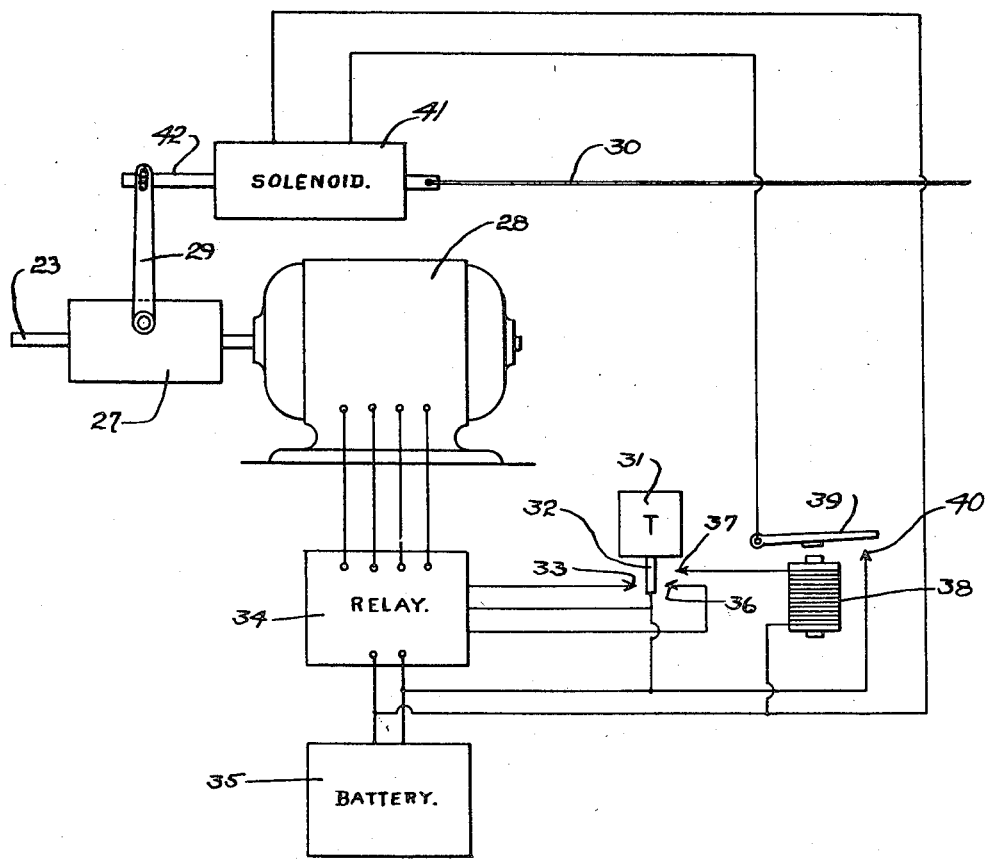
Fig. 4 is a diagrammatic view illustrating a safety control mechanism embodying this invention.

Fig. 4 illustrates diagrammatically a thermostat control which may be used. The thermostat 31 is exposed to the air from the engine and moves its contact arm 32 to the left with respect to Fig. 4 of the drawing, when the engine is too cool and less air is required for cooling so that it strikes the contact 33 and closes an electric circuit including the relay 34 and the battery 35 causing the armature of the motor 28 to be so connected to its field as to rotate to adjust the spin vanes towards closed position. When the thermostat is satisfied, the contact arm 32 leaves the contact 33 and the motor 28 is deenergized.

If the engine is too warm and increased cooling is required, the thermostat 31 will move its contact arm 32 to the right so that it strikes the contact 36 which closes an electric circuit which connects the field and armature of the motor 28 oppositely to the previously described connection so that the direction of rotation of the motor is reversed so that it rotates the spin vanes towards open position.

The relay 34 is a conventional motor reversing relay which acts to reverse the polarity of the armature of the motor with respect to its field for reversing the direction of rotation of the motor.

In case the thermostatic control mechanism becomes jammed so that the spin vanes cannot become opened, a crew member by withdrawing the rod 30 can actuate the clutch 27 for declutching the motor drive from the spin vanes whereby the air pressure upon same will rotate them to open position.

The thermostat 31 may be provided with a high point contact 37 which when the temperature rises to a dangerous level, is contacted by the arm 32 to close a circuit energizing the solenoid 38 from the battery 35. When this happens the relay solenoid 38 pulls down its spring biased armature 39 against the contact 40 and closes a circuit connecting the solenoid 41 to the battery 35. The solenoid 41 then retracts its plunger 42 which is connected to the lever 29 of the clutch 27 and declutches the motor 27 from the vane adjusting mechanism.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. In an airplane engine cooling system, a fan for cooling the engine, a plurality of spin vanes pivoted around the inlet of said fan, said vanes having larger surfaces on the downstream sides of their pivots whereby air pressure urges them towards open position, means including thermostatically controlled means for rotating said vanes towards closed position upon temperature decreases, and means for disconnecting said rotating means from said vanes whereby air pressure rotates said vanes to open position.

2. In an airplane engine cooling system, a fan for cooling the engine, spin vanes pivoted in the inlet to the fan, said vanes having larger surfaces on the downstream sides of their pivots whereby air pressure urges them toward open position, means for rotating said vanes, a clutch connected to said rotating means, a motor connected to said clutch, means including a thermostat responsive to the temperature of the engine for controlling said motor, and means including a control for actuating said clutch for declutching said motor from said rotating means, whereby said vanes are automatically rotated by the air pressure to open position.

HARRY E. MORTON.

REFERENCES CITED

The following references are of record in the file of this patent:

UNITED STATES PATENTS

| Number | Name | Date |
| --- | --- | --- |
| 1,604,328 | Walker | Oct. 26, 1926 |
| 2,050,700 | Hagen | Aug. 11, 1936 |
| Re. 19,728 | Dintilhac | Oct. 22, 1935 |
| 1,691,593 | Tank | Nov. 13, 1928 |
| 2,330,622 | Ramshorn | Sept. 28, 1943 |
| 2,337,861 | Adamptchik | Dec. 28, 1943 |
| 2,351,203 | Hanson | June 13, 1944 |
| 1,251,214 | Fulton | Dec. 25, 1917 |

FOREIGN PATENTS

| Number | Country | Date |
| --- | --- | --- |
| 341,277 | Great Britain | Jan. 15, 1941 |
| 841,711 | France | Feb. 13, 1939 |
| 548,018 | Great Britain | Sept. 22, 1942 |